(No Model.)

J. M. ROBINSON.
INSECT POWDER DUSTER.

No. 439,563.  Patented Oct. 28, 1890.

Witnesses
Saml R Turner
Van Buren Hillyard

Inventor
John Milton Robinson
By his Attorneys
R.S. & A.P. Lacey

United States Patent Office.

JOHN MILTON ROBINSON, OF BAYOU LA CHUTE, LOUISIANA.

INSECT-POWDER DUSTER.

SPECIFICATION forming part of Letters Patent No. 439,563, dated October 28, 1890.

Application filed June 4, 1890. Serial No. 354,238. (No model.)

*To all whom it may concern:*

Be it known that I, JOHN MILTON ROBINSON, a citizen of the United States, residing at Bayou La Chute, in the parish of Caddo and State of Louisiana, have invented certain new and useful Improvements in Insect-Powder Distributers; and I do hereby declare the following to be a full, clear, and exact description of the invention, such as will enable others skilled in the art to which it appertains to make and use the same.

This invention relates to devices for distributing insect-powder, and has for its object to provide an apparatus which will positively distribute the powder, and which can be held at a safe distance from the operator, and in which both hands can be brought into service for supporting and operating the device.

The improvement consists in the distributing-cylinder, which is journaled on a frame suspended from the handle or pole, being held in a fixed position relative to said pole or handle by the gravity of the frame and the said cylinder.

The improvement further consists in gearing interposed between a portion of the said distributing-cylinder and the pole or handle, whereby a turning of the handle or pole will effect a rotation of the said cylinder.

The improvement also consists in the novel construction, arrangement, and the peculiar combination of the parts, which hereinafter will be more fully described and claimed, and which are shown in the annexed drawings, in which—

Figure 1:
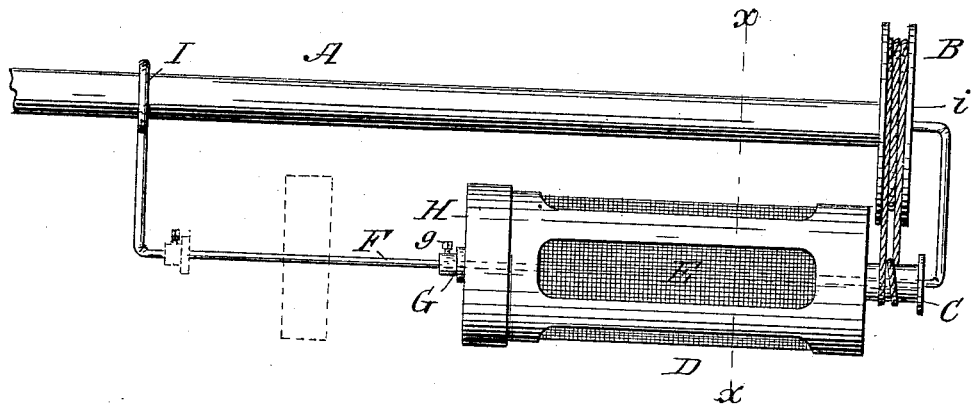
Figure 2:
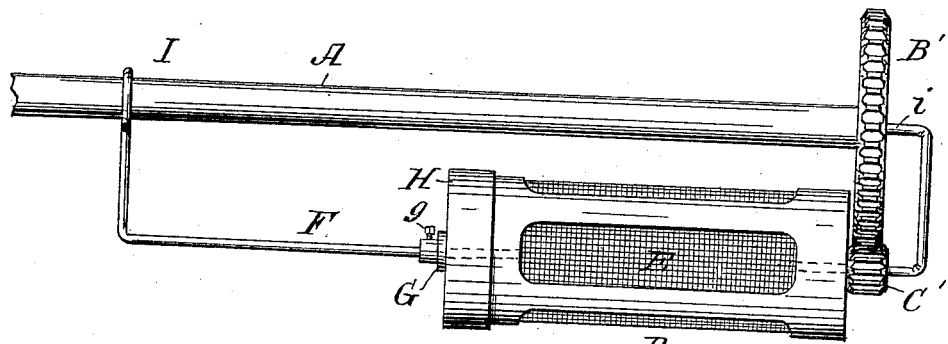
Figure 3:
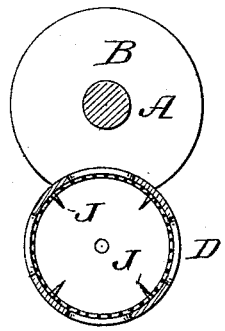

Figure 1 is a side view of the distributer embodying my invention. Fig. 2 is a similar view of a modified form. Fig. 3 is a cross-section on the line $x\ x$ of Fig. 1.

The pole A may be of any required length, and is provided at or near its outer end with a frame F, which is approximately U shape, and which is suspended from the said pole in any desired manner, so that a turning of the said pole will not effect a turning of the frame. For economy and simplicity of construction, the frame F is made from stout wire, one end of which is bent to form the eye I, through which the pole or handle is inserted, and the other end bent to form the journal $i$, which is inserted in a socket in the end of said pole or handle.

The distributing-cylinder B is suitably constructed to permit the egress of the insect-powder through its sides, and that it may be of suitable capacity and sufficiently stout it is preferred to provide a series of openings E in the side of a stout sheet-metal cylinder and cover said openings with cloth or wire-gauze. This cylinder is journaled on the frame F, and is closed at one end by the cover H, the latter being held on the cylinder by the collar G, which is secured on the frame F by the binding-screws $g$.

Suitable gearing is interposed between and connects the distributer with the pole or handle for the purpose of effecting a rotation of the said cylinder by turning of the pole or handle. This gearing may be of any well-known form, either band, friction, or cog gearing.

In Fig. 1 a grooved pulley B is shown secured on the pole or handle, and an endless band passes around the said pulley and a tubular extension C at the end of the distributing-cylinder. In Fig. 2 a gear-wheel B 1' is shown secured on the pole or handle and meshing with a pinion C' at the end of the distributing-cylinder.

The operation of the distributer is as follows: To fill the cylinder, loosen the binding-screw $g$ and draw the collar G on the frame F away from the cover H, when the said cover can also be moved away from the cylinder, thereby permitting the filling of the cylinder with the powder. After the cylinder is filled or provided with the required amount of insect-powder the cover and collar are replaced and held in position by turning the binding-screw $g$.

To discharge the powder on the plant, the cylinder is rotated by turning the handle or pole A. It will be seen that the pole A serves a twofold purpose—first, as a means of support for the distributing-cylinder, whereby the same may be held at a safe distance from the operator; second, as a means for rotating the said cylinder.

To prevent the powder following the cylinder in its rotation and to stir the same, agitators J are provided on the inner side of the cylinder and arranged lengthwise thereof.

Having thus described my invention, what I claim, and desire to secure by Letters Patent, is—

1. An insect-powder distributer comprising a pole or handle and a distributer suspended from, geared to revolve with, and operated from the said pole or handle by turning the same in the hands of the operator, substantially as set forth.

2. The combination, with the pole or handle, and the frame suspended from the said pole or handle, of the distributing-cylinder journaled on the said frame and geared to revolve with the said pole or handle, substantially as set forth.

3. The hereinbefore-specified insect-powder distributer, composed of a pole or handle, an approximately U-shaped form suspended from the said pole or handle, a distributing-cylinder having agitators journaled on the said frame and geared to revolve with and operated from the said pole or handle by turning the same in the hands of the operator, a cover for closing the open end of the distributing-cylinder adapted to slide on the said frame, and means, as collar G and binding-screw g, for holding the cover in place, substantially as and for the purpose described.

In testimony whereof I affix my signature in presence of two witnesses.

JOHN MILTON ROBINSON.

Witnesses:
FRANK R. HICKS,
S. C. ROGERS.